United States Patent
Horn et al.

(10) Patent No.: US 11,220,339 B2
(45) Date of Patent: Jan. 11, 2022

(54) METHOD FOR INSTALLING AN INTERIOR FITTING COMPONENT OF AN AIRCRAFT, INTERIOR FITTING COMPONENT FOR AN AIRCRAFT AND SYSTEM FOR MOUNTING INTERIOR FITTING COMPONENTS

(71) Applicant: Airbus Operations GmbH, Hamburg (DE)

(72) Inventors: Alexander Horn, Hamburg (DE); Surya Utomo, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 289 days.

(21) Appl. No.: 16/558,709

(22) Filed: Sep. 3, 2019

(65) Prior Publication Data
US 2020/0070979 A1    Mar. 5, 2020

(30) Foreign Application Priority Data
Sep. 5, 2018    (DE) ...................... 10 2018 121 623.8

(51) Int. Cl.
B64D 11/00    (2006.01)

(52) U.S. Cl.
CPC .... B64D 11/003 (2013.01); *B64D 2011/0046* (2013.01)

(58) Field of Classification Search
CPC ..................... B64D 11/03; B64D 2011/0046
See application file for complete search history.

(56) References Cited

U.S. PATENT DOCUMENTS

| 9,725,189 B2 | 8/2017 | Umlauft et al. |
| 9,771,170 B2 * | 9/2017 | Moje .................... B64D 11/003 |
| 2010/0301537 A1 | 12/2010 | Humfeldt et al. |
| 2011/0138603 A1 | 6/2011 | Blees et al. |
| 2012/0131779 A1 | 5/2012 | Umlauft et al. |

FOREIGN PATENT DOCUMENTS

| DE | 102009023393 A1 | 12/2010 |
| DE | 102010026683 A1 | 1/2012 |
| DE | 102010055995 A1 | 6/2012 |
| EP | 2801524 A1 | 11/2014 |
| WO | 2008043557 A1 | 4/2008 |

* cited by examiner

*Primary Examiner* — Timothy D Collins
*Assistant Examiner* — Justin Michael Heston
(74) *Attorney, Agent, or Firm* — Greer, Burns & Crain, Ltd.

(57) ABSTRACT

A method for installing a preassembled internal fitting component of an aircraft, at least one luggage compartment being attached in an articulated manner to a fixing means and beside a ceiling lining and, optionally, a service unit being attached in an articulated manner to the luggage compartment and, likewise optionally, a covering element being attached in an articulated manner to the service unit. Following transport of the preassembled internal fitting component into a final mounting position, the individual elements of the internal fitting component can be mounted in the aircraft one after another by folding out and mounting. Also, a corresponding internal fitting component and to a system for mounting internal fitting components with a mobile mounting device.

12 Claims, 5 Drawing Sheets

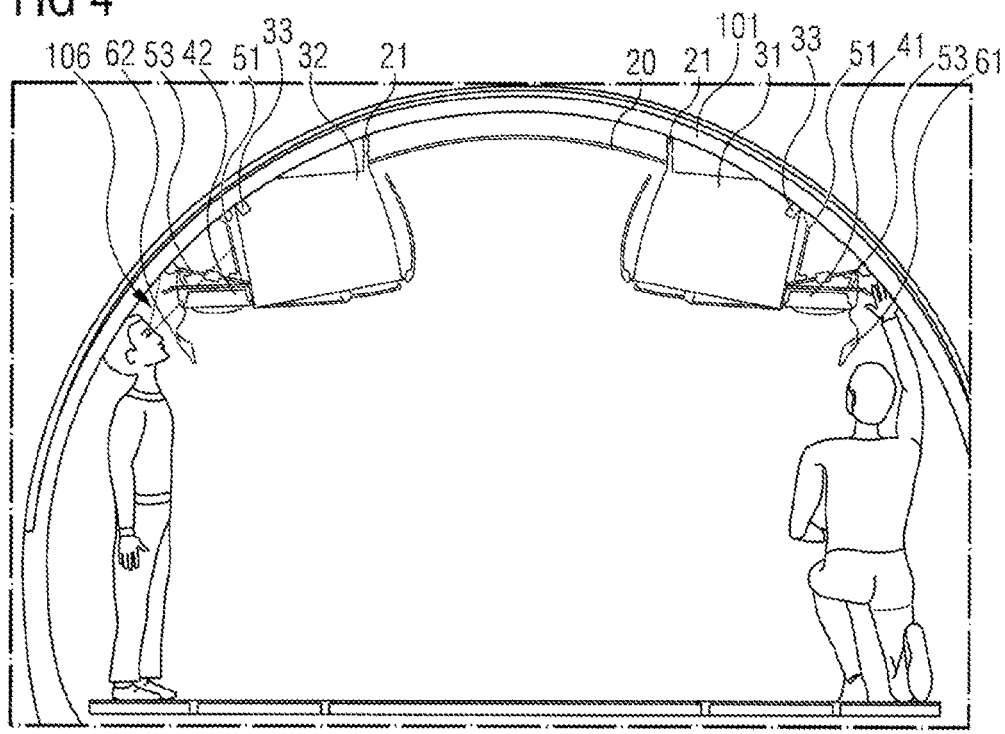
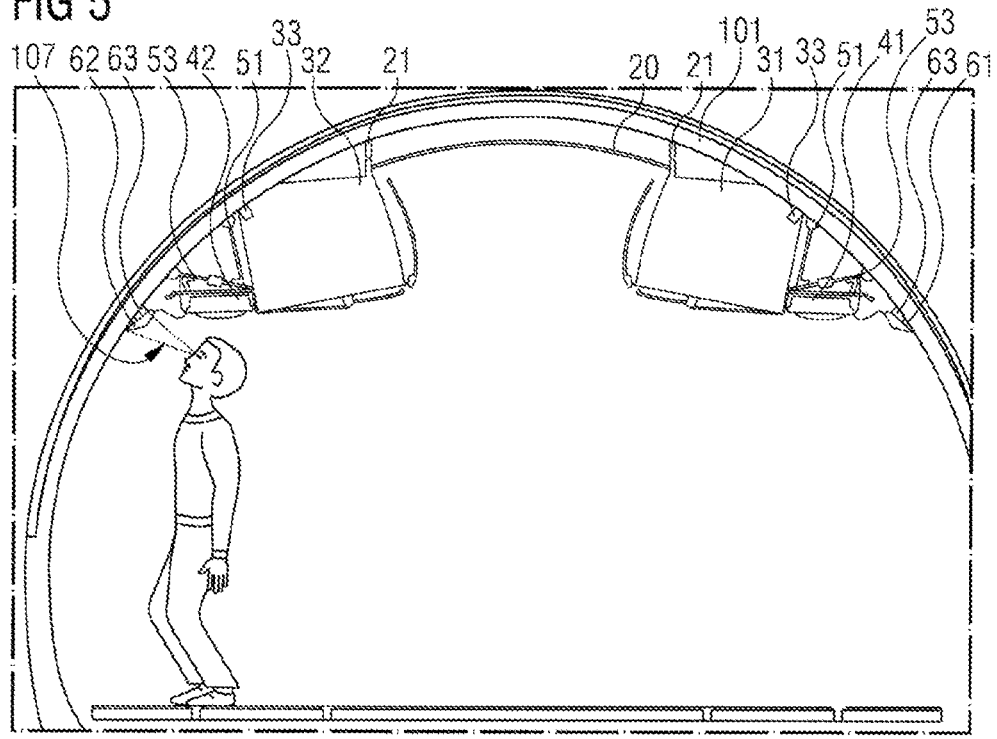

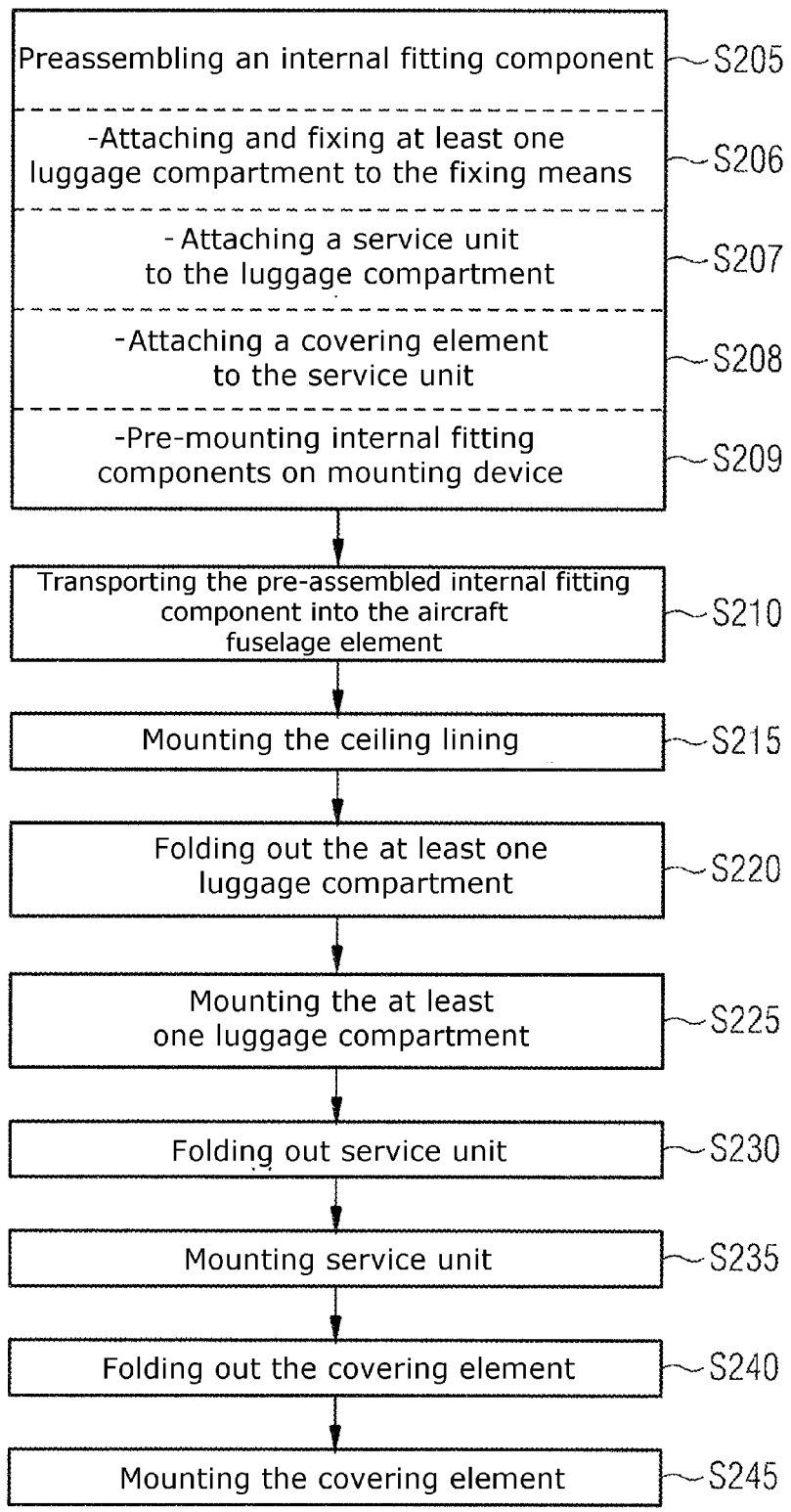

FIG 7
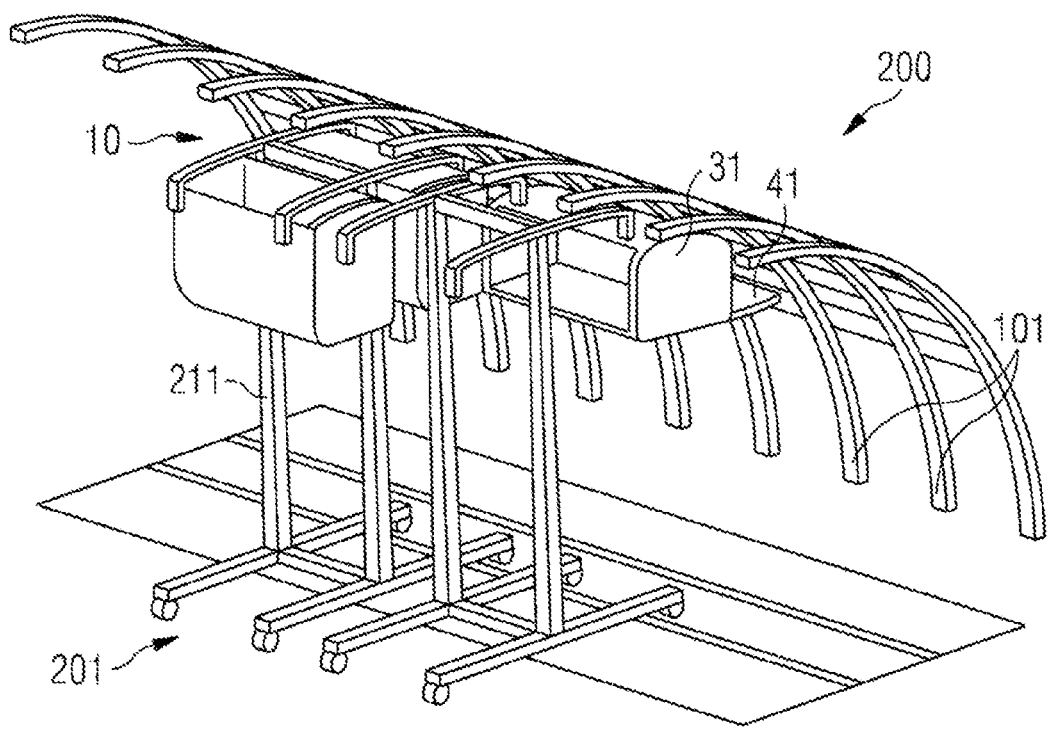
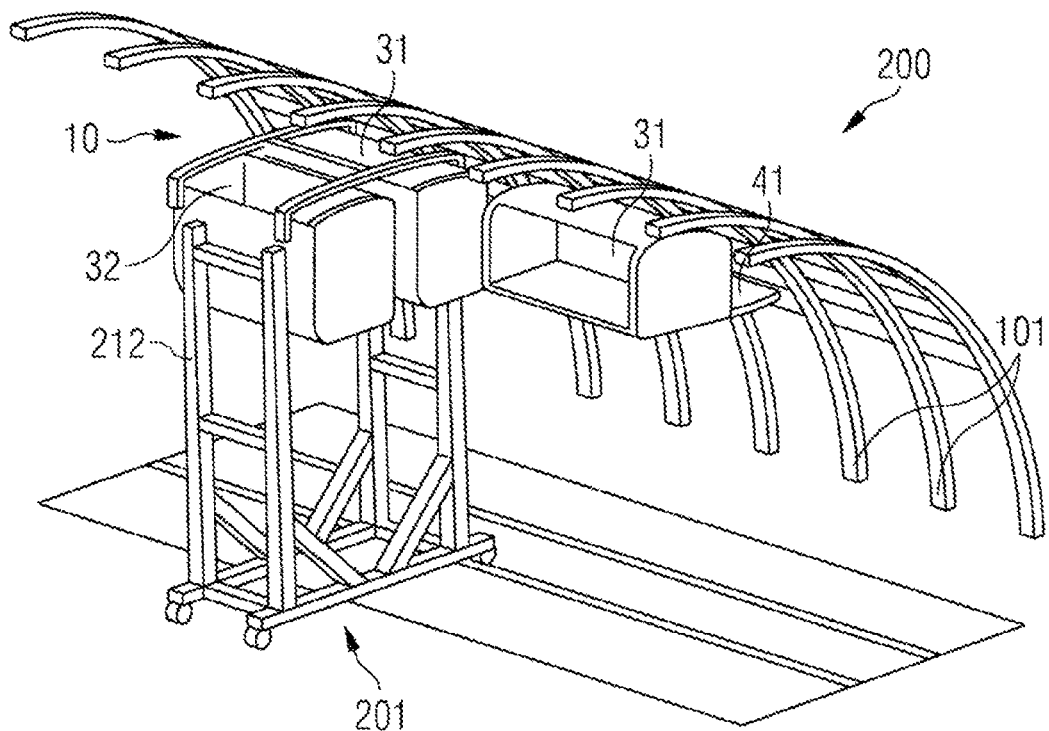

METHOD FOR INSTALLING AN INTERIOR FITTING COMPONENT OF AN AIRCRAFT, INTERIOR FITTING COMPONENT FOR AN AIRCRAFT AND SYSTEM FOR MOUNTING INTERIOR FITTING COMPONENTS

CROSS-REFERENCES TO RELATED APPLICATIONS

This application claims priority from German Patent Application No. 10 2018 121 623.8 filed Sep. 5, 2018, the entirety of which is incorporated herein by reference.

FIELD OF THE INVENTION

The invention relates to a method for installing an internal fitting component of an aircraft, to an internal fitting component for an aircraft and to a system for mounting internal fitting components in an aircraft. In particular, the invention relates to a method for pre-assembling an internal fitting component by means of an articulated connection of at least one luggage compartment to a fixing means and beside a ceiling lining and mounting the internal fitting component, including folding out the at least one luggage compartment and mounting the luggage compartment in an aircraft fuselage element. In addition, the invention relates to such an internal fitting component with a ceiling lining and at least one luggage compartment and to a system for mounting such an internal fitting component.

BACKGROUND OF THE INVENTION

During the mounting of internal fitting components in an aircraft, it is currently usual to introduce the internal fitting components, such as for example dado panels, side linings, ceiling linings, light strips, luggage compartments, etc., individually into the aircraft fuselage and to fix them to the aircraft structure there. However, the internal fitting of an aircraft becomes very time-consuming as a result. In order to facilitate this installation work, although relatively large and relatively heavy components can be transported into the aircraft fuselage on transport carriages, in order then to be fixed to the aircraft structure, this merely reduces the physical work for the mounting personnel.

The invention is based on an object of providing a method, an internal fitting component, and a system which permit efficient mounting of internal fitting components in an aircraft.

SUMMARY OF THE INVENTION

This object may be achieved by a method having the features of one or more embodiments described herein, by an internal fitting component having the features of one or more embodiments described herein, and by a system having the features of one or more embodiments described herein.

The terms "aircraft" and "vehicle" are used synonymously in the present disclosure, since the internal fitting component described can be used for any vehicles, for example aircraft.

According to a first aspect for the better understanding of the invention, a method for installing an internal fitting component of an aircraft comprises preassembling the internal fitting component by attaching and fixing a ceiling lining and at least one luggage compartment to a fixing means. The luggage compartment is attached in an articulated manner to the fixing means and beside one side of the ceiling lining. For example, the luggage compartment can be attached to the fitting means with one or more hinges and/or a piano hinge. Furthermore, the fixing means can be connected firmly to the vehicle body at a frame, stringer or an installation rail. The fixing means can form a latching connection, into which a corresponding mating piece latches and thus produces a firm connection between mating piece and fixing means. Of course, the fixing means can also be implemented in the form of a screw connection, clamp connection or other plug-in connection.

Alternatively or additionally, the luggage compartment can be attached to the ceiling lining by means of a film hinge. The variant having a film hinge, at least part of the ceiling lining and at least part of the luggage compartment can be manufactured in one piece.

The at least one luggage compartment can be fixed to the fixing means and/or the ceiling lining in such a way that a front side of the luggage compartment, pointing into the vehicle interior in a finally mounted state of the luggage compartment, faces the ceiling lining or rests at least partly on the ceiling lining. In other words, the luggage compartment is rotated relative to the ceiling lining by means of the articulated attachment, so that one side of the luggage compartment faces the ceiling lining or rests in the latter. When the luggage compartment and the ceiling lining are viewed in a finally mounted state and in the cross section of the aircraft, the front side of the luggage compartment points towards the center of the aircraft cross section. The articulated connection between luggage compartment and fixing means and/or ceiling lining can be provided, for example, on an upper edge of the front side or in a region of the top side (lid) of the luggage compartment that faces the front side.

As a result, the luggage compartment can be pivoted under the side of the ceiling lining that is visible as seen in the finally mounted state such that the front side is located directly beside or on the visible side of the ceiling lining. The fixing means can be arranged in a region of the side of the ceiling lining that faces the luggage compartment. For example, the fixing means can be arranged flush with the side of the ceiling lining that faces the luggage compartment or project over the ceiling lining on this side.

In general, luggage compartments have a cross-sectional shape (when viewed in the finally mounted state and in cross section of the aircraft) the height of which turns out to be slightly less than the depth, the depth being the distance between front side and opposite rear side of the luggage compartment. If the luggage compartment is then pivoted through about 90° relative to the ceiling lining by means of the articulated arrangement, the luggage compartment can be arranged (virtually) completely underneath the ceiling lining. In particular if the ceiling lining (viewed in cross section of the aircraft) has a width which is equal to or greater than the height of the luggage compartment, the luggage compartment can be arranged completely underneath the ceiling lining.

This fixed transport position of the luggage compartment underneath the ceiling lining facilitates the method steps of transporting the preassembled internal fitting component into a final mounting position in an aircraft fuselage element, mounting the fixing means (and thus initially the ceiling lining) in the aircraft fuselage element, folding out the luggage compartment, and mounting the luggage compartment in the aircraft fuselage element. In other words, the preassembled internal fitting component is moved into the aircraft fuselage element in the longitudinal direction of the aircraft and arranged at a point within the aircraft in the final mounting position of the internal fitting component. Following the mounting of the fixing means and the ceiling lining in the aircraft fuselage element, the luggage compartment is moved from the transport position into its final mounting position (by means of rotation about the attachment between luggage compartment and fixing means) and can likewise be mounted in the aircraft fuselage element.

While the transport position of the luggage compartment configures the internal fitting component in a very space-saving manner, so that it can be transported quickly and easily into the aircraft fuselage element, the luggage compartment can additionally be fixed quickly and simply in the aircraft fuselage element. This permits an increase in efficiency in the mounting of internal fitting components in an aircraft.

In one design variant, the preassembling of the internal fitting component can further comprise attaching a service unit to the luggage compartment on a side of the luggage compartment opposite to the articulated connection to the fixing means. The service unit can be connected in an articulated manner to the luggage compartment. In other words, the luggage compartment has two articulated arrangements, which are provided on opposite sides of the luggage compartment. For example, one articulated arrangement can be provided at the front on an upper side of the luggage compartment, while a further articulated arrangement is provided at the bottom of a rear side of the luggage compartment. Alternatively, an articulated arrangement can be provided respectively on the front and rear on an upper side of the luggage compartment, front and rear referring to the front side and rear side of the luggage compartment.

The service unit can be passenger-based service units (so-called Personal Service Units) or associated line channels (so-called Personal Service Channels), which are used to supply the passengers in the corresponding region of the aircraft with fresh air, light, information, etc.

The method can further comprise folding out the service unit and mounting the service unit in the aircraft fuselage element. The service units arranged in this way can likewise be transported in a space-saving manner and fixed quickly in the aircraft fuselage element. The service unit can be attached freely movably to the luggage compartment. Optionally, the service unit can also be fixed in a transport position, in which it is arranged in a space-saving manner on one side of the luggage compartment or rests on the same.

In a further development, the preassembling of the internal fitting component can further comprise attaching a covering element to the service unit on a side of the service unit opposite to the articulated connection to the luggage compartment. This connection between covering element and service unit can also be configured in an articulated manner, so that the method further comprises folding out the covering element and mounting the covering element in the aircraft fuselage element. Here, too, the covering element can be attached freely movably to the service unit. Optionally, the covering element can also be fixed in a transport position, in which it is arranged in a space-saving manner on one side of the service unit or rests on the same.

Thus, the internal fitting component can have multiple parts, which reach from the ceiling element as far as a side lining of the aircraft and are connected in an articulated manner relative to each other.

Each articulated attachment of a further element of the internal fitting component permits a compact form of the internal fitting component in its transport configuration and makes it possible for the installing personnel to easily see and reach the fixing means needed for the mounting. For example, the fixing means for the element of the internal fitting component arranged more centrally, viewed in the cross-section of the aircraft, can be arranged or attached in the vicinity of the articulated arrangement between two elements of the internal fitting component. As a result, the element of the internal fitting component that is located further on the outside can still be folded down (folded in in the transport position), and the fixing means of the more central element can easily be reached and seen. This accelerates the mounting operation and facilitates the attachment of the internal fitting component to the aircraft fuselage. Further facilitation of the mounting operation and therefore acceleration can be achieved by using latching elements as a fixing means. Here, firstly part of the latching elements can be fixed to the aircraft structure, into which suitable mating pieces which are provided on the respective element of the internal fitting component can then latch.

In a further design variant, the preassembling of the internal fitting component further comprises pre-mounting the internal fitting component on a mobile mounting device. The mobile mounting device can be a specifically configured supporting device for the internal fitting component with integrated transport unit. Alternatively, it is a supporting device for the internal fitting component which can be moved by means of conventional transport means, for example a fork-lift truck, stacker truck, etc. The transporting comprises moving the mounting device into the aircraft fuselage element to a final mounting position of the internal fitting component in the aircraft fuselage element. The final mounting position of the internal fitting component is a specific position in the longitudinal direction and transverse direction of the aircraft, at which the internal fitting component is connected to the aircraft fuselage. The mounting device can optionally be set up to move the internal fitting component fixed thereto in the vertical direction (z axis) of the aircraft. As a result, the internal fitting component can be moved rapidly to the final mounting position and fixed to the aircraft fuselage.

In yet another design variant, the preassembling can comprise attaching a luggage compartment respectively to a respective fixing means on opposite sides of the ceiling lining, each luggage compartment being connected in an articulated manner to the fixing means. For example, two luggage compartments can be provided symmetrically on opposite sides of the ceiling lining. The preassembling further comprises fixing the two luggage compartments to each other, so that the two undersides of the luggage compartments, forming in a finally mounted state of the luggage compartments, face each other or rest at least partly on each other. This corresponds to an arrangement of the luggage compartments under the ceiling lining, each of the front sides of the two luggage compartments facing the ceiling lining or resting at least partly thereon.

Particularly advantageous is the configuration of a ceiling lining which, when viewing the cross-section of the aircraft, has a width which is equal to or greater than the sum of the height of the two luggage compartments. As a result, in their respective transport position, the luggage compartments take up no more space in the transverse direction of the aircraft than the ceiling lining.

Furthermore, the method can comprise folding out a first of the luggage compartments, mounting the first luggage compartment in the aircraft fuselage element, folding out a second of the luggage compartments and mounting the second luggage compartment in the aircraft fuselage element. These method steps can be carried out one after another for each of the luggage compartments. Alternatively, the method steps can also be carried out simultaneously by further mounting personnel, by which means the mounting operation of the internal fitting component can be accelerated further.

According to a further aspect, an internal fitting component for an aircraft comprises at least one fixing means, which is set up to be fixed to a vehicle structure, a ceiling lining, which is fixed to the at least one fixing means, and at least one luggage compartment, which is attached in an articulated manner to the fixing means and beside one side of the ceiling lining. The luggage compartment can be pivoted relative to the fixing means and the ceiling lining between a transport position and a finally mounted position. In the transport position, an underside of the luggage compartment, forming in the finally mounted position of the luggage compartment, can be arranged substantially perpendicular to the ceiling lining. This corresponds to the arrangement of the front side of the luggage compartment directly in front of or on the ceiling lining.

In a further development, the internal fitting component can further comprise a service unit, which is connected in an articulated manner to the luggage compartment on a side of the luggage compartment that is opposite the articulated connection to the fixing means. The service unit can be pivoted relative to the luggage compartment between a transport position and a finally mounted position. The service unit can be fixed freely movably to the luggage compartment and, in the transport position, can hang down the vertically from the luggage compartment. Alternatively, the service unit in the transport position can be fixed to the luggage compartment such that an upper side of the service unit, forming in the finally mounted position of the service unit, can rest on a rear side of the luggage compartment, forming in the finally mounted position of the luggage compartment. The upper side of the service unit forms an upper side of the service unit, facing the aircraft fuselage, that is not visible in the finally mounted position of the service unit.

In yet another design variant of the internal fitting component, this can comprise a covering element, which is connected in an articulated manner to the service unit on a side of the service unit that is opposite the articulated connection to the luggage compartment. The covering element can be pivoted relative to the service unit between the transport position and a finally mounted position. Here, too, the covering element can be fixed freely movably to the service unit and, in the transport position, hang down vertically from the service unit. Alternatively, the covering element in the transport position can be fixed to the service unit such that an underside of the covering element, forming in the finally mounted position of the covering element, rests on an underside of the service unit forming in the finally mounted position of the service unit.

The arrangement of the individual elements of the internal fitting components in their respective transport position covers the visible regions of the individual elements, by which means the latter are protected against damage.

According to a further aspect, a system for mounting internal fitting components in an aircraft comprises a mobile mounting device and at least one internal fitting component according to the second aspect.

The mobile mounting device can have a T-shaped supporting structure, which is set up to support the fixing means and/or the ceiling lining of the internal fitting component while the at least one luggage compartment is located both in the transport position and in the finally mounted position. In other words, the ceiling lining of the preassembled internal fitting component rests on the upper horizontal section of the T-shaped supporting structure with a side which is visible in the finally mounted position of the ceiling lining and faces the vehicle interior. Alternatively, the fixing means can be fixed to the T-shaped supporting structure at one end of the horizontal section of the same. In any case, the supporting structure is arranged centrally underneath the ceiling lining and it does not hinder the mounting personnel, who must work on the fixing means and the ceiling lining on the outside and on the outside in front of the luggage compartment folded into the transport position. Even in the folded-out position of the luggage compartment, the centrally arranged T-shaped supporting structure is not in the way. Of course, the T-shaped supporting structure can be removed after the fixing means (and thus the ceiling lining) have been fixed in the aircraft fuselage element.

Alternatively, the mobile mounting device can have a U-shaped supporting structure, which is set up to support the fixing means and/or the ceiling lining and/or the at least one luggage compartment of the internal fitting component while the at least one luggage compartment is located in the transport position. Here, the outer limbs of the U-shaped supporting structure can hold the luggage compartment/compartments in its/their transport position, so that no additional fixing means for the fixing of the luggage compartment/compartments in the transport position are needed. After the fixing means (and thus the ceiling lining) have been fixed in the aircraft fuselage element, the U-shaped supporting structure can be removed, which means that the luggage compartment/compartments is/are free and can be folded up into its/their final mounting position.

In a further design variant, the system can further comprise at least one further fixing means, which is set up to be fixed to a vehicle structure and/or an internal fitting element. For example, the fixing means can be connected firmly to the vehicle body at a frame, stringer or an installation rail. Furthermore, the fixing means is set up to hold the at least one luggage compartment, the service unit or the covering element. For example, the fixing means for holding the luggage compartment, the service unit or the covering element can form a latching connection, into which a corresponding mating piece, which is attached to the luggage compartment, the service unit or the covering element, can latch and thus produce a firm connection between mating piece and fixing means. Of course, the fixing means can also be implemented in the form of a screw connection, clamp connection or other plug-in connection.

The aspects, further developments, configurations and variants described here can be combined as desired, so that further not explicitly described design variants are covered in the present disclosure.

BRIEF DESCRIPTION OF THE DRAWINGS

Exemplary embodiments of the invention will be described in more detail below by using the drawings.

FIG. 4 shows, schematically, a cross section of an aircraft during a third section of the mounting of an internal fitting component, FIG. 5 shows, schematically, a cross-section of an aircraft with an internal fitting component in its final mounting position, FIG. 6 shows a flowchart of a method for installing an internal fitting component, and FIG. 7 shows, schematically, a system for mounting internal fitting components.

DETAILED DESCRIPTION OF THE PREFERRED EMBODIMENTS

According to the present invention, a method for installing an internal fitting component, an internal fitting component for an aircraft and a system for mounting internal fitting components are described.

Figure 1:
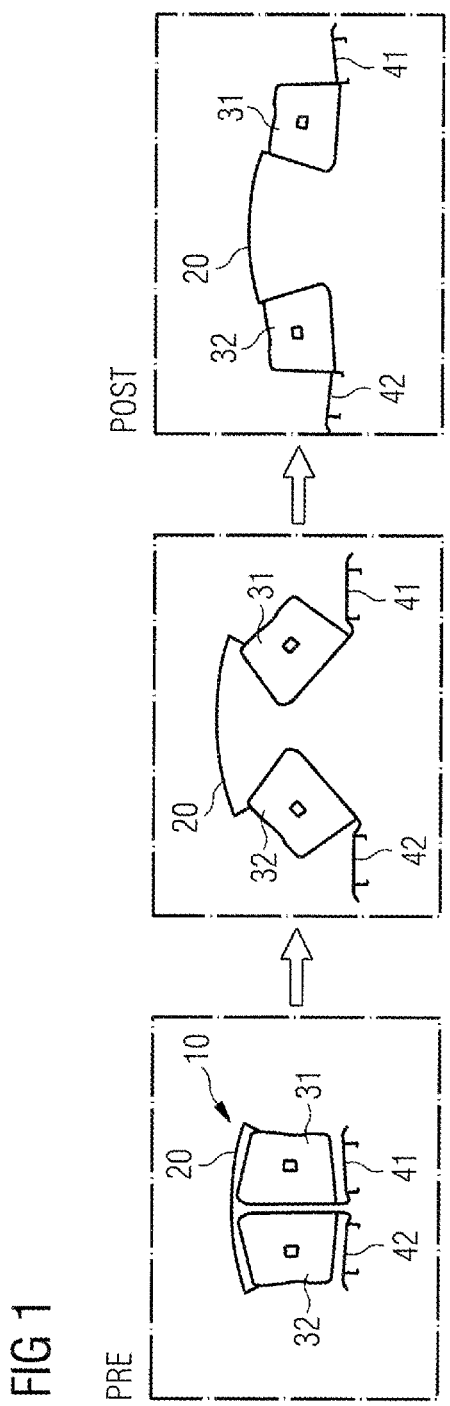
FIG. 1 shows, schematically, an internal fitting component in its transport position and the folding out of elements of the internal fitting component at the respective final mounting position thereof.

FIG. 1 shows, schematically from left to right, an exemplary internal fitting component 10 in its transport position, a second stage, and a final mounting position (finally mounted position). The internal fitting component 10 can comprise a ceiling lining 20 and at least one luggage compartment 31, 32. The luggage compartments 31, 32 are connected in an articulated manner on opposite sides of the ceiling lining 20 to at least one fixing means 21 (FIG. 2), to which the ceiling lining 20 is also fixed, so that each of the luggage compartments 31, 32 can be pivoted relative to the ceiling lining 20 between a transport position and a finally mounted position. In the transport position, the sides of the luggage compartments 31, 32 which form an underside of the luggage compartments 31, 32 in the finally mounted position rest on each other and are arranged substantially perpendicular to the ceiling lining 20. In the final mounting position of the luggage compartments 31, 32, the respective luggage compartment 31, 32 adjoins the ceiling lining 20 or overlaps the latter, so that the ceiling lining 20 and the luggage compartments 31, 32 conceal the vehicle structure completely.

Furthermore, in each case a service unit 41, 42 is connected in an articulated manner to the respective luggage compartment 31, 32 on a side of a luggage compartment 31, 32 that is opposite the articulated connection to the fixing means 21. The service unit 41, 42 can also be pivoted relative to the luggage compartment 31, 32 between a transport position and a finally mounted position. In an optional transport position, one side of each service unit 41, 42 which, in the finally mounted position of the service unit 41, 42, forms an upper side of the service unit 41, 42 is arranged on a rear side of the luggage compartment 31, 32 forming in the finally mounted position of the respective luggage compartments 31, 32 or rests thereon. Otherwise, in its transport position the service unit 41, 42 hangs freely movably on the luggage compartment 31, 32.

As a result of this arrangement of the ceiling lining 20, the luggage compartments 31, 32 and the service units 40, 42, the internal fitting component 10 takes up little space in its transport position. In this compact form, the internal fitting component 10 can easily be moved into an aircraft or aircraft fuselage element. Both the luggage compartments 31, 32 and the service units 41, 42 can be folded out via the respective attachment relative to the central element of the internal fitting component 10, here the ceiling lining 20 or the respective luggage compartment 31, 32, and mounted in the vehicle. At the same time, no further covering element has to be provided in order to protect the aircraft structure lying behind from being seen from the aircraft interior (for example the passenger cabin).

Such a method for installing an internal fitting component will now be described in more detail by using FIGS. 1 to 6. Here, FIG. 6 shows an exemplary flowchart of a method for installing an internal fitting component 10, while FIGS. 2 to 5 show a cross section of an aircraft or aircraft fuselage 101 during various stages of the mounting of an internal fitting component 10.

Firstly, in a step S205, an internal fitting component 10 is preassembled. This comprises attaching and fixing (S206) a ceiling lining 20 and at least one luggage compartment 31, 32 to a fixing means 21, as shown in FIG. 1. Optionally, in a step S207, a service unit 41, 42 can be attached to each of the luggage compartments 31, 32. Likewise optionally, in a step S208, a covering element 51, 52 can be attached to each service unit 41, 42.

The preassembled internal fitting component 10 (see FIG. 1 "PRE") is transported into an aircraft fuselage element 101 in a following step S210. There, it is moved into a position in which it is to be fixed firmly to the aircraft fuselage element 101. By using the fixing means 21, which are fixed to a vehicle structure of the aircraft fuselage element 101, the ceiling lining 20 is mounted in the aircraft fuselage element 101 in a step S215.

Figure 2:
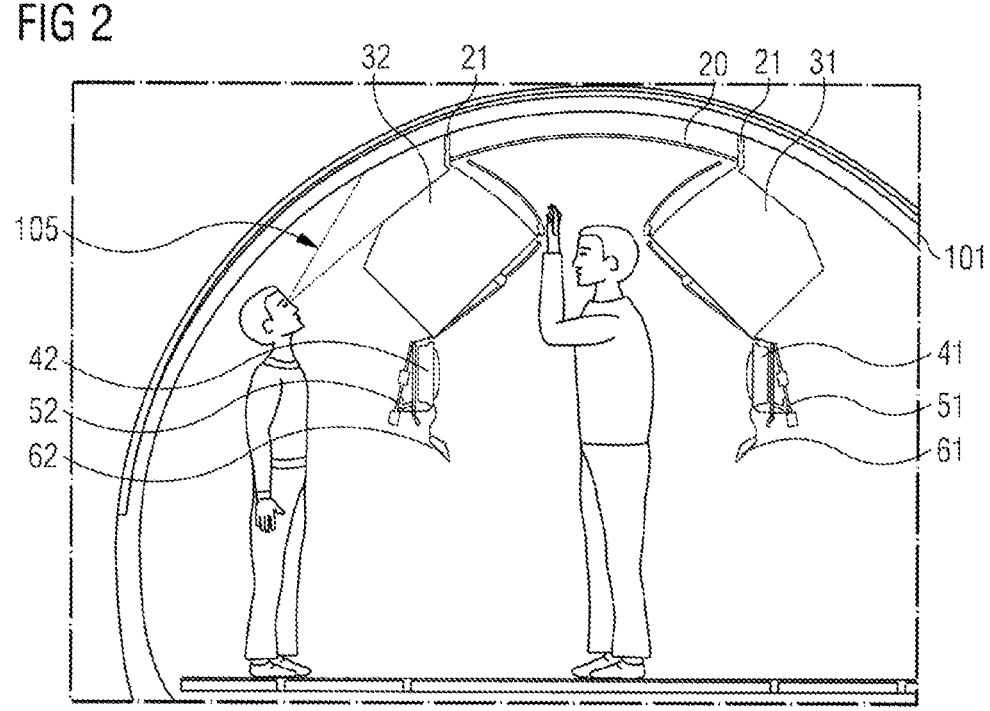
FIG. 2 shows, schematically, a cross section of an aircraft during a first section of the mounting of an internal fitting component.
Figure 3:
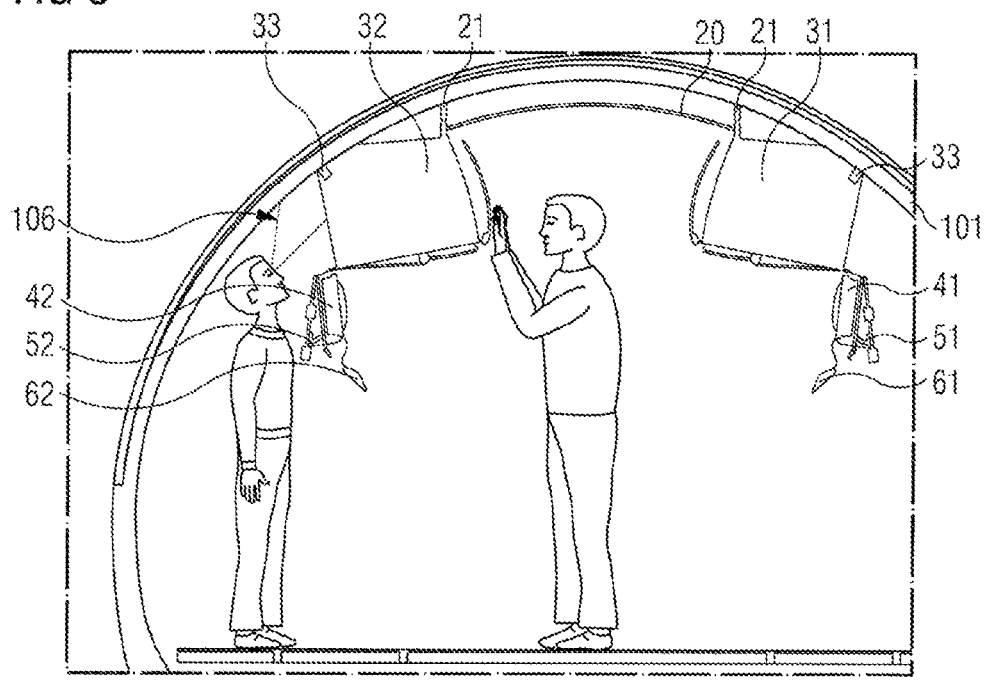
FIG. 3 shows, schematically, a cross section of an aircraft during a second section of the mounting of an internal fitting component.

The at least one luggage compartment 31, 32 can then be folded out in step S220, as illustrated in FIG. 2. As a result of the articulated connection of the luggage compartment 31, 32 to the fixing means 21, the luggage compartment (here the left-hand luggage compartment 32) can be pivoted in the clockwise direction from the transport position (FIG. 1). If the luggage compartment 32 is attached to the fixing means 21 on its upper side and in the vicinity of the ceiling lining 20, the upper side of the luggage compartment 32 can be seen easily, as illustrated dashed by the free viewing area 105 in this FIG. 2. Thus, necessary work above the luggage compartment 32, including the fixing of the fixing means 21 to the aircraft fuselage element 101, can still be performed easily. After further folding out (step S220), the luggage compartment 31, 32 can be mounted in the aircraft fuselage element 101 (step S225). This is shown in FIG. 3. For the mounting (S225) of the luggage compartments 31, 32, a further fixing means 33 can be used. Particularly advantageous is a latching element 33, which is attached to the aircraft fuselage element 101 such that by folding out (S220) the luggage compartment 31, 32, a corresponding mating piece (not shown separately) corresponds locally with the latching element 33 and latches in with the rotational movement of the luggage compartment 31, 32.

For the case in which the internal fitting component 10 has a service unit 41, 42, the service units 41, 42 can be folded out in a subsequent step S230. Firstly, lines and connections for the service units 41, 42 can also be arranged and fixed or connected. As a result of the articulated arrangement of the service units 41, 42 on the respective luggage compartment 31, 32, the necessary viewing area 106 (dashed in FIGS. 3 and 4) continues to be free in the working space provided for this purpose.

In a further step S235, the service unit 41, 42 is mounted in the aircraft fuselage element 101. For this purpose, for example, a first fixing means 51 can be fixed to the aircraft fuselage element 101 or another aircraft structure. This fixing means 51 can also replace the fixing means 33 for the respective luggage compartment 31, 32. As can be seen from FIGS. 3 and 4, the fixing means 51 can likewise be folded out and coupled mechanically to the aircraft fuselage element 101 in the vicinity of the respective luggage compartment 31, 32. As a result of this arrangement of the fixing means 51, sufficient space remains above the service unit 41, 42 for lines or other components which extend in the longitudinal direction of the aircraft.

Instead of the fixing element 51 or in addition thereto, a further fixing means 53 can be provided, which can be fixed to an aircraft structure in the aircraft fuselage element 101. The respective service unit 41, 42 is arranged (mounted) on the fixing means 53, so that the service units 41, 42 can be mounted (S235) by the fixing means 53 after being folded out (S230).

Finally, in a further step S240, a covering element 61, 62 can be folded out, in order to cover a gap between the associated service unit 41, 42 and a side lining (not shown) of the aircraft fuselage element 101. This gap is used for fixing the associated service unit 41, 42 and/or as a working space for connecting the service units 41, 42 to corresponding lines, as illustrated on the right on FIG. 4. For this purpose, the covering element 61, 62 is connected in an articulated manner to the service unit 41, 42 or the fixing means 53.

Here, too, a fixing means 63, for example in the form of a latching element, can be used for rapid mounting (step S245). The fixing means 63 can couple the covering element 61, 62 mechanically either to an aircraft structure in the aircraft fuselage element 101 and/or the side lining Here, too, the viewing area 107 (dashed in FIG. 5) is free for the completion of this work. The fixing means 63 for the covering elements 61 and 62 can be configured such that it can be opened quickly and easily by hand or with a specific tool. As a result, all the other fixing means 21, 33, 51, 53 are accessible (one after another), so that the internal fitting component 100 can also be dismantled again easily and quickly.

FIG. 7 finally shows, schematically, a system 200 for mounting internal fitting components 10 in an aircraft fuselage element 101. The system 200 comprises at least one internal fitting component 10 and a mobile mounting device 201. In FIG. 7, the ceiling lining 20 of the internal fitting component 10 is not shown, in order not to conceal the details of the system 200.

The mobile mounting device 201 can have either a T-shaped supporting structure 211 or a U-shaped supporting structure 212. In both cases, at least one preassembled internal fitting component 10 is pre-mounted on the supporting structure 211, 212 (see also step S209 in FIG. 6). While the T-shaped supporting structure 211 is space-saving, the U-shaped supporting structure 212 permits simple fixing (S206) of at least one luggage compartment 31, 32 in the transport position. The fixing means 21 can be arranged and fixed at the respective free ends of the T-shaped supporting structure 211 or U-shaped supporting structure 212, in order thus to use existing load-bearing elements of the internal fitting component 10.

The system 200 can comprise multiple mobile mounting devices 201, which can each carry at least one preassembled internal fitting component 10. Thus, the multiple mobile mounting devices 201 can be moved into the aircraft fuselage element 101, so that, simultaneously or at least in a rapid succession, multiple preassembled internal fitting components 10 can be transported (S210) into the aircraft fuselage element 101.

The method described here, the internal fitting component 10 and the system 200 offer a simplification of the mounting of internal fitting elements. The fact that the elements of the internal fitting component 10 are coupled to one another means that the physical work for the mounting personnel is also facilitated since, following the attachment of the ceiling lining 20, the remaining elements of the internal fitting component 10 are held at the respective attachment points. Only when the respective element is folded out must a certain force be applied although, as compared with holding the complete element, it transpires that this is much lower.

The variants, configurations and exemplary embodiments explained above serve merely to describe the claimed teaching but do not restrict this to the variants, configurations and exemplary embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for installing an internal fitting component of an aircraft, the method comprising:
preassembling the internal fitting component by attaching and fixing a ceiling lining and at least one luggage compartment to a fixing means, the luggage compartment being attached in an articulated manner to the fixing means and beside one side of the ceiling lining, and a front side of the luggage compartment, pointing into an aircraft interior in a finally mounted state of the luggage compartment, facing the ceiling lining, or resting at least partly on the ceiling lining;
transporting the preassembled internal fitting component into a final mounting position in an aircraft fuselage element;
mounting the fixing means in the aircraft fuselage element;
folding out the luggage compartment; and
mounting the luggage compartment in the aircraft fuselage element.

2. The method according to claim 1, wherein the preassembling of the internal fitting component further comprises attaching a service unit to the luggage compartment on a side of the luggage compartment opposite to the articulated connection to the fixing means, the service unit being connected in an articulated manner to the luggage compartment, and wherein the method further comprises:
folding out the service unit; and
mounting the service unit in the aircraft fuselage element.

3. The method according to claim 2, wherein the preassembling of the internal fitting component further comprises attaching a covering element to the service unit on a side of the service unit opposite to the articulated connection to the luggage compartment, and wherein the method further comprises:
folding out the covering element; and,
mounting the covering element in the aircraft fuselage element.

4. The method according to claim 1, wherein the preassembling of the internal fitting component further comprises pre-mounting the internal fitting component on a mobile mounting device, and
wherein the transporting comprises moving the mounting device into the aircraft fuselage element to a final mounting position of the internal fitting component in the aircraft fuselage element.

5. The method according to claim 1, wherein the preassembling of the internal fitting component comprises attaching a luggage compartment respectively to a respective fixing means on opposite sides of the ceiling lining, each luggage compartment being connected in an articulated manner to the fixing means, and
wherein the preassembling of the internal fitting component further comprises fixing the two luggage compartments to each other, so that the two undersides of the luggage compartments, forming in a finally mounted state of the luggage compartments, face each other or rest at least partly on each other, and
wherein the method further comprises:
folding out a first of the luggage compartments;
mounting the first luggage compartment in the aircraft fuselage element;
folding out a second of the luggage compartments; and,
mounting the second luggage compartment in the aircraft fuselage element.

6. An internal fitting component for an aircraft, the internal fitting component comprising:
at least one fixing means, which is configured to be fixed to a vehicle structure;
a ceiling lining, which is fixed to the at least one fixing means; and
at least one luggage compartment, which is attached in an articulated manner to the fixing means and beside one side of the ceiling lining,
wherein the luggage compartment is configured to pivot relative to the fixing means and the ceiling lining between a transport position and a finally mounted position, and
wherein an underside of the luggage compartment, forming in the finally mounted position of the luggage compartment, is arranged substantially perpendicular to the ceiling lining.

7. The internal fitting component according to claim 6, further comprising:
a service unit, which is connected in an articulated manner to the luggage compartment on a side of the luggage compartment that is opposite the articulated connection to the fixing means, and,
wherein the service unit is configured to pivot relative to the luggage compartment between a transport position and a finally mounted position, and
wherein an upper side of the service unit, forming in the finally mounted position of the service unit, rests on a rear side of the luggage compartment, forming in the finally mounted position of the luggage compartment.

8. The internal fitting component according to claim 7, further comprising:
a covering element, which is connected in an articulated manner to the service unit on a side of the service unit that is opposite the articulated connection to the luggage compartment, and,
wherein the covering element is configured to pivot relative to the service unit between a transport position and a finally mounted position, and an underside of the covering element, forming in the finally mounted position of the covering element, rests on an underside of the service unit forming in the finally mounted position of the service unit.

9. A system for mounting internal fitting components in an aircraft, the system comprising:
a mobile mounting device; and
at least one internal fitting component according to claim 6.

10. The system according to claim 9, wherein the mobile mounting device comprises a T-shaped supporting structure, which is configured to support the fixing means, the ceiling lining of the internal fitting component, or both while the at least one luggage compartment is located in the transport position and in the finally mounted position.

11. The system according to claim 9, wherein the mobile mounting device comprises a U-shaped supporting structure, which is configured to support the fixing means, the ceiling lining, the at least one luggage compartment of the internal fitting component, or a combination thereof while the at least one luggage compartment is located in the transport position.

12. The system according to claim 9, further comprising:
a fixing means, which is configured to be fixed to a vehicle structure and to hold the at least one luggage compartment, the service unit, or the covering element.

* * * * *